Oct. 9, 1962 T. L. ETTER 3,057,375

FLUID-PRESSURE DATA STORAGE DEVICE

Filed July 29, 1957

INVENTOR.
THOMAS L. ETTER
BY Darby & Darby
ATTORNEYS

United States Patent Office 3,057,375
Patented Oct. 9, 1962

3,057,375

FLUID-PRESSURE DATA STORAGE DEVICE

Thomas L. Etter, New York, N.Y., assignor, by mesne assignments, to TRG, Incorporated, Long Island City, N.Y., a corporation of New York Filed July 29, 1957, Ser. No. 674,665
19 Claims. (Cl. 137—552.5)

The present invention relates to apparatus for the storage of data, and more particularly to apparatus adapted to receive fluid pressure digital data input signals and to produce similar output signals.

Many various types of devices are known for the storage of digital information or data, such as punched cards, magnetic drums, and mechanical registers. These devices store such information in the form of physical or magnetic records. The present invention is designed to store data which is supplied in the form of a digital fluid pressure signal. The invention is also adapted to produce a "read-out" or output which is also in the form of a digital fluid pressure signal.

The present device provides utmost simplicity and a minimum number of parts and thus provides data storage apparatus which is inexpensive yet reliable and economical of space and weight. Although it is contemplated that the present invention will be most useful in computers or data handling devices operating by means of fluid pressure signals, it may also be used where electric or mechanical signals are converted to fluid pressure signals, permitting storage in apparatus according to the present invention.

It is accordingly an object of the present invention to provide data storage apparatus adapted to directly receive and read out fluid-pressure signals.

It is another object of the present invention in a more specific aspect to provide a fluid-pressure data storage apparatus utilizing a movable plug which may be moved to occupy various positions in response to fluid pressure signals applied to the apparatus thereby to store and indicate certain data stored in the apparatus.

It is a further similar object of the present invention to provide fluid-pressure data storage apparatus wherein a plate is provided with a number of pockets arranged in pairs with a plug placed in one pocket of each pair and which is further provided with means for moving the plugs under the control of fluid-pressure signals and means for sensing the position of the plugs to produce fluid-pressure signals indicative of data stored.

It is a still further object of the present invention to provide fluid-pressure data storage apparatus having a greater number of data storage units than data reading and writing units and further including means for moving the reading and writing units to a desired data storage unit to write in or read out data at that particular station.

Other objects and advantages of the present invention will be apparent from a consideration of the following description in combiantion with the appended drawings in which.

Figure 1:
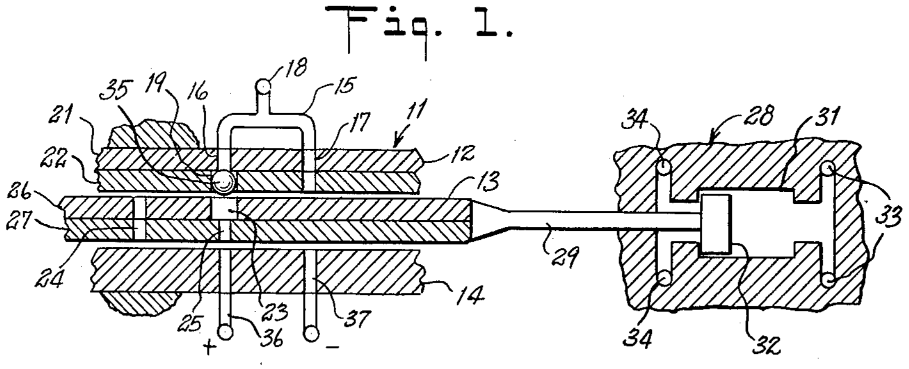
FIG. 1 is a fragmentary sectional view of a fluid-pressure data storage element according to the present invention.

Referring now to FIG. 1, a data storage device 11 is shown, including plate members 12, 13 and 14. The upper plate 12 and the lower plate 14 are fixed while the middle or carriage plate 13 is slidably movable between the upper and lower plates 14. The plates 12, 13 and 14 may be made of metal or any other moderately rigid material. Metal has some additional advantages in that it may be rolled to precise thickness without great expense and may be readily samped to the desired configuration. Plastics or other materials could also be used in the construction of the plates if desired.

Fluid channels 16 and 17 are provided extending through the upper plate 12 and are connected by connecting conduit 15 independent of plate 12, which conduit also communicates with an outlet port 18. The fluid pressure signals transmitted to the storage device 11 are supplied to the port 18 and the fluid pressure output signals supplied by the storage device 11 are derived from port 18. The signals may be produced by any valve mechanism in conjunction with a source of fluid pressure such as a pump and/or reservoir; the output signals may be transmitted to any desired pressure sensing or utilization device.

One of the fluid channels 16 in plate 12 is provided with an enlargement or pocket 19. The pocket 19 with its communicating channel 16 may be formed in any desired manner; for example the pocket 19 and the channel 16 may be formed by constructing the upper plate 12 of two pieces of sheet material 21 and 22. The fluid channel 16 and the pocket 19 may thus be formed by providing a small hole in the sheet 21 and a corresponding larger hole in the sheet 22. The pocket and channel may be formed in any other suitable way, as by molding, drilling, punching, etc. The other fluid channel 17 may be formed by corresponding holes in the two sheets 21 and 22 which may be of and are shown as the same size.

The carriage plate 13 is also provided with a pocket 23 and with transverse fluid channels 24 and 25, fluid channel 25 communicating with the pocket 23. It should be noted that the pocket 23 opens upward, while the pocket 19 opens downward and with the carriage plate 13 in the position shown in FIG. 1 the two pockets cooperate to form a single chamber. The carriage plate 13 may be formed in a manner similar to the upper plate 12 by joining two sheets 26 and 27, or in any other suitable way.

Any suitable means may be utilized for the movement of the carriage plate 13. For the purpose of illustration a fluid-pressure cylinder actuator 28 is shown in FIG. 1. The actuator 28 is connected to the carriage plate 13 by a rod 29. The rod 29 is connected to a piston 32 which is slidably retained in a fluid pressure cylinder 31. Two communicating ports 33 are provided at one end of the cylinder 31 while two other communicating ports 34 are provided at the other end of the cylinder 31.

The actuator 28 may be operated to control the position of the carriage plate 13 by applying appropriate fluid pressures to the ports 33 and 34. The actuator 28 is shown purely for the purpose of illustration and it will be obvious that many other devices, not necessarily fluid-pressure operated (mechanically or electrically controlled, for example), may be used to control the position of the carriage plate 13. The lower plate 14 may be provided with fluid channels 36 and 37 corresponding to and opposite the channels 16 and 17 in the upper plate 12.

The actual data storage function of the device is performed by a plug 35 which is placed in and retained in one of the pockets 19 or 23 as described below. The plug 35 in FIG. 1 is illustratively shown as spherical in shape, which has the advantage that it is less likely to interfere with the mechanical operation of the carriage plate 13. The plug 35 need not be spherical however and might be constructed of disk, cylindrical or any other desired shape.

The present device as exemplified by the embodiment shown in FIG. 1 is capable of many modes of operation; for illustration a particular mode of operation will be described which is particularly simple for the purpose of explanation. It should be realized however that the particular pressures and particular physical arrangement of the elements of the device are not limited to those shown and that the device is subject to many variations and modifications within the scope of the invention.

In one mode of operation of the device two fluid pressures of different values are utilized as a medium for transmitting and storing binary digital data. By way of example, the presence of the higher pressure may indicate the digit "1" while the lower pressure indicates the digit "0." A pressure corresponding to the higher of the fluid pressure values is continuously supplied to the fluid channel 36 as indicated by the plus sign in FIG. 1. The lower pressure is continuously applied to the channel 37 as indicated by the minus sign; it may be negative if desired. The values of pressures employed are of course dependent upon the particular application. However, high pressures will generally not be necessary and pressures amounting to only a few pounds per square inch will be sufficient generally. Higher pressures may of course be employed if desired.

The position of the carriage 13 in FIG. 1 is the "read-in" or writing position. In other words, at this position of the carriage, the apparatus is ready to receive data for storage. The plug 35 in FIG. 1 is shown located in the upper pocket 19 in plate 12. The plug 35 is maintained in this position by the higher pressure applied to the channel 36 when a lower or negative pressure signal is applied to the port 18. On the other hand, if a positive pressure signal is applied at port 18 the upward and downward pressures will be equal and the plug 35 will drop into pocket 23 by its own weight. Thus, the data appearing at port 18, in the form of a higher pressure (+) or a lower pressure (−) determines whether plug 35 is correspondingly at its lower position (in plate 13) or its higher position (in plate 12). In the situation illustrated, port 18 has a minus signal, so plug 35 is retained in its upper position.

Figure 2:
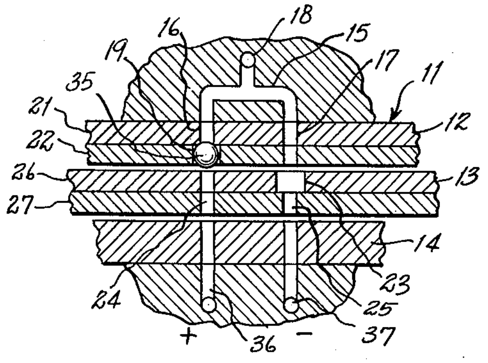
FIG. 2 is a fragmentary sectional view of a portion of the device of FIG. 1 shown in a different position of operation.

When it is desired to store the data supplied at the port 18 the carriage plate 13 is moved to the right to the position shown in FIG. 2. This traverse may be accomplished by supplying appropriate pressures to the ports 33 and 34 of the actuator 28 as previously explained.

When the carriage plate 13 has been moved to its rightward position it is then in the "read-out" or output position. It will be noted that the movement of the carriage causes the plug 35 to be retained in position in whichever of the pockets 19 or 23 in which it was located at the time of movement of the carriage plate 13. It will further be noted that, in the illustration used, the plug 35 will be seated in the pocket 19 to close the fluid channel 16 due to the high pressure supplied to the lower surface of the plug through the channel 36 and the lower pressure supplied to the surface of the plug through channels 37, 25, 17, 15, and 16. It will therefore be seen that the positive pressure applied to channel 36 is effectively cut off and that the negative pressure applied to channel 37 is supplied to the port 18 from whence it may be transmitted to any desired utilization device.

To recapitulate the operation of the device as shown in FIGS. 1 and 2, when a negative pressure is supplied to the port 18 and the carriage is moved to the "read-out" position, a negative pressure will then be supplied to the port 18 so long as the carriage 13 is retained in the read-out postion.

It will be obvious from the consideration of FIGS. 1 and 2 that if a positive pressure is supplied to the port 18 while in the "read-in" position shown in FIG. 1 and the carriage plate 13 is then moved to the right as shown in FIG. 2, the plug 35 will be located in the pocket 23 rather than in the pocket 19, and thus a positive pressure will be conveyed to the outlet port 18.

From the foregoing description it will be seen that a device of exceptional simplicity and efficiency is provided for storage of fluid-pressure signal information. In effect, data is stored in the form of the presence of plug 35 in pocket 23 of carriage 13 or its absence. The device shown by way of example in FIG. 1 may have many modifications. For example, it may be undesirable to rely upon the weight of the plug 35 to determine the position of the plug and hence the information stored in the device. In this event the operation of the data storage element 11 may be rendered more positive by changing the pressure applied to the fluid channel 36 from a high or positive pressure to some intermediate pressure during the "read-in" phase of the operation. If an intermediate pressure is applied to the channel 36, the plug 35 will be forcibly moved to one of the pockets 19 or 23 depending upon the application of a high or low pressure to the port 18.

The carriage plate 13 may be retained in the readout or storage position as long as desired. The device is reset by opposite actuation of operator 28, as by reversing the perssures applied to its ports 33, 34. It will then retain the signal applied just before subsequent actuation of operator 28, as already described.

Figure 3:
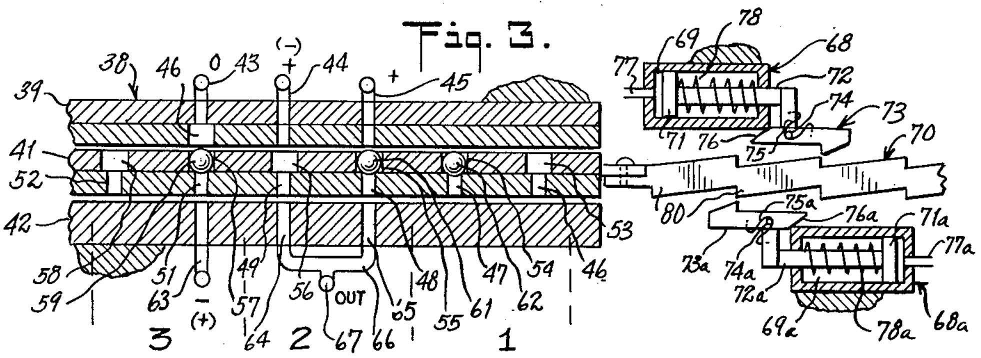
FIG. 3 is a fragmentary sectional view of a fluid-pressure data storage device having a plurality of data storage elements according to the present invention.

FIG. 3 shows a slightly more complex fluid pressure data storage arrangement. In FIG. 3 a multi-element data storage device 38 is formed with a fixed upper plate 39, a movable carriage plate 41 and a fixed lower plate 42 in a manner somewhat similar to the previously described device of FIG. 1. In the device of FIG. 3 however three channels 43, 44 and 45 are provided through the upper plate 39. Only the first of these channels, channel 43, is provided with a pocket 46.

Channel 43 and pocket 46 form the writing apparatus for the multi-element data storage device. The pocket 46 is utilized to transfer the multiple plugs in this device from one location to another to indicate the data to be stored. In distinction to FIG. 1, where the presence or absence of the plug represents the signal, in FIG. 3 the signal is represented by the presence of a plug in one of two positions in the carriage plate 41, as described below.

Channels 44 and 45 are the reading channels in the upper plate 39 and are therefore not provided with pockets. Channels 44 and 45 are provided with appropriate pressures to cause the data stored in a particular storage element to be indicated by the fluid-pressure output signal as will later be explained.

The carriage plate 41 of the storage device 38 is provided with a plurality of fluid channels 46, 47, 48, 49, 51 and 52, the number being determined by the amount of data to be stored. Associated with each of these channels is a respective pocket 53, 54, 55, 56, 57 or 58.

Each adjacent pair of pockets comprise a single data storage element. For example, pockets 53 and 54 together form data storage element 1. The other pairs of pockets 55, 56, and 57, 58 form data storage elements 2 and 3. The number of elements is in no way limited to three, this number being selected only for the purpose of illustration. One of the two pockets forming each pair contains a plug; for example, in data storage element 1 pocket 54 contains plug 62. Plugs 61 and 59 are contained in data storage elements 2 and 3, respectively. From the foregoing explanation it will be seen that the device of FIG. 3 is generally similar to the device of FIG. 1, except that a single reading and a single writing unit is utilized for a plurality of data storage elements. This necessitates the provision of a plug and two pockets for each of the data storage elements to free the writing element to transfer plugs within other data storage elements.

The lower plate 42 in FIG. 3 is generally similar to the upper plate described with reference to FIG. 1, except that three channels are provided so that there is a writing channel 63 which is separate and distinct from the reading channels 64 and 65. The reading channels 64 and 65 are connected as before by a connecting conduit 66 which is connected to an outlet port 67.

The fluid perssures which may be applied to the various ports of the multi-element storage device when the carriage plate 41 is moved from one position to another are indicated in FIG. 3. Ports 44 and 45 are continuously supplied with a high pressure (indicated by plus signs). This high pressure serves to retain the plugs 59, 61 and 62 in a downward position where they will not interfere with the movement of the carriage plate 41. An intermediate pressure (indicated by a zero) is applied to port 43 and a low pressure (indicated by a minus sign) is applied to the channel 63 so that the plugs passing across this position are also urged downward to avoid inadvertent lifting of the plugs into the pocket 46.

When it is desired to read or write data, certain of the pressures applied to the various ports are changed. To read the data stored in data storage element 2 the carriage plate 41 will be placed in the position shown in FIG. 3. The pressure applied to channel 44 will be changed to low pressure (minus). Thus if the plug 61 is located as shown in FIG. 3, channel 65 will be plugged and a lower or negative pressure will be supplied to the output 67 through channel 64. Conversely, if plug 61 were in pocket 56, the output would receive a high pressure signal.

Generally the multi-element data storage device will be prearranged with all plugs in positions to provide a negative reading at all storage elements. Data will then be read into the elements by causing the plugs of selected ones of the storage elements to be moved to provide a postive reading. Any type of data may be stored in this device, but as an example binary numbers may be stored in the device with a negative output to indicate a "zero" in binary notation and using the positive output to indicate a "one" in binary notation.

In the device shown by way of illustration in FIG. 3 the writing operation may be accomplished by movement of the carriage 41 to the right. In this figure, data storage elements have already been impressed with and are storing positive and negative signals. The plug 59 in data storage element 3 is shown in its negative reading position which is its normal or unrecorded position. If binary digital data were being recorded this position would indicate the digit zero. In order to write the digit one, a positive pressure would be applied to the channel 63. This pressure would cause the plug 59 to be lifted into the pocket 46. The carriage 41 would then be moved to the right a unit distance to bring the pocket 58 under the pocket 46. At this time the pressure at the channel 63 would be returned to its normal negative condition, thus causing the plug 59 to be deposited in the pocket 58. In this fashion the data stored in the storage element 3 would be changed from a zero to a one.

For recording or storing successive digits, carriage 41 is similarly stepped rightward, two steps per digit, to successively position the pair of pockets forming each storage element under writing pocket 46.

It is preferred that a positive signal be supplied to the channel 63 to store data to produce a positive reading output and that a negative input cause a negative readout, as described above. It is not absolutely necessary that the device operate in this fashion however and the opposite arrangement producing a reversal of sign might in some cases be desired. Generally it will be desired to return all plugs to a negative position preliminary to recording a second body of data in the device.

The operation required to change the data stored from positive reading to negative reading or to erase the stored data is the opposite of that described above for writing. That is, the left pocket of a pair of pockets comprising a storage element is placed under the write-in pocket 46; the write-in channel 63 is supplied with a positive pressure to force the plug into pocket 46; the carriage is moved one step to the left and the pressure at 63 is returned to negative to drop the plug into the "zero" or negative reading pocket.

The movement of the carriage plate 41 to locate desired ones of the data storage element adjacent a reading or writing head may be accomplished by any suitable actuating mechanism. FIG. 3 shows a simple carriage actuating mechanism by way of illustration.

The carriage plate 41 in FIG. 3 is translated by an actuating mechanism including piston-type actuators 68 and **68*a* and an arm 70 provided with ratchet-type teeth 80**.

The actuator 68 comprises a cylinder 69 containing a piston 71 to which is connected a piston rod member 72. A pawl member is pivotally attached to the piston rod 72 by means of a pin 74. The pawl 73 is urged toward the toothed rod 70 by means of a spring 75. The pawl 73 is provided with a ramp 76 at the rearward extremity which cooperates with the edge of the cylinder 69 to lift the pawl out of engagement with the ratchet teeth 80 when it reaches its leftward limit of travel.

A port 77 is provided in the cylinder 69 to which may be supplied a fluid pressure sufficient to overcome the force of the spring 79 thereby forcing the piston 71 to the right. From the description of the actuator 68 it will be apparent that the application and removal of a fluid pressure to the port 77 will cause the pawl 73 to move to the right to engage a tooth of the toothed arm 70. Upon removal of the pressure the spring 78 will return the pawl to its leftward position causing the arm 70 and hence the carriage plate 41 to be stepped one position to the left.

A similar piston actuator mechanism **68*a* is provided for moving the carriage plate 41 to the right. The parts of the actuator 68*a* correspond to parts of the actuator 68** and are given the same reference numbers with the addition of the letter *a*. It should be understood that any other suitable means may be provided for moving the carriage plate 41. Although it will generally be preferred that a fluid-pressure actuator be used for the carriage, electrical, magnetic, mechanical or other types might be used.

Thus, a recording or data storage apparatus is provided, in which the positions of the plugs, in either of two pockets, represent the data stored. The carriage plate 41 with its stored plugs may be removed from the apparatus for separate storage or may be retained in the apparatus for subsequent use. The writing and read-out mechanisms need not be in the same device, but may be separately used, although to add either of these functions to the other is so simple it is desirable to provide the apparatus with both functions.

The following specific example is provided to aid in the understanding of the operation of the apparatus of FIGURE 3.

Suppose that it is desired to record in data storage element 1, comprising pockets 53 and 54, the binary digit "0," irrespective of the previous condition of data storage element 1. The steps required are as follows:

(1) The indicated normal pressures are retained at ports 43, 44, 45 and 63 namely, intermediate pressure at port 43, high pressure at ports 44 and 45, and low pressure at port 63.

(2) Actuator 68 is operated three times by applying three pressure pulses to port 77.

(3) The pressure at port 63 is changed from low to high.

(4) Actuator 68 is operated a single time by supplying a pressure pulse to port 77.

(5) Pressure at port 63 is restored to normal low pressure.

If one desired to read what was recorded in storage element 1, starting from the position shown in FIGURE 3, the following sequence may be followed.

(1) Operate actuator 68 two times by supplying two pressure pulses to port 77, while the previously described normal pressures are maintained at ports 43, 44, 45 and 63.

(2) Change the pressure at port 44 from high pressure to low pressure.

(3) A high pressure would be supplied at output port 67 indicating ball 62 to be in pocket 54 rather than in pocket 53 which condition may be designated to correspond to a binary digit "1."

Locating a predetermined memory unit in a readout position is accomplished in the same general manner as in other data storage devices such as magnetic drums, tapes, etc. That is, in the case where the present location of the slide is known (or the memory unit which is desired to be read has a known relation to the present location) the slide is stepped to the left by actuator 68 or the right by actuator 68*a* the appropriate number of steps to locate the predetermined memory unit in the readout position. The slide can always be placed in a known position by stepping one of the actuators a number of times equal to or exceeding the total number of pockets thus reaching the limit of movement of the slide.

A ball may be transferred from left to right by the use of actuator 68 rather than actuator 68*a*, which is utilized to transfer a ball from right to left.

Figure 4:
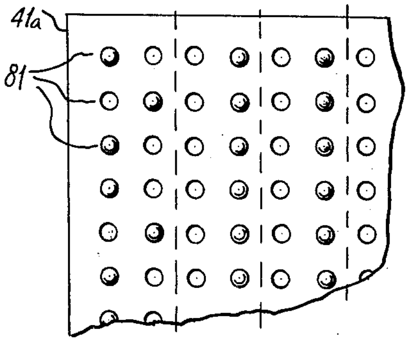
FIG. 4 is a top plan view of the carriage plate of the the device of FIG. 3 showing an exemplary arrangement of data storage elements.

The device of FIG. 3 may be constructed with a plurality of rows of data storage elements, each row being constructed as illustrated in the sectional view of FIG. 3. FIG. 4 shows a carriage 41*a* having a number of rows 81 of data storage elements. Each storage element row 81 may be constructed in the fashion illustrated in FIG. 3, with a pair of pockets for each storage element. In this manner a large number of elements may be placed in a carriage plate of relatively small area and may be controlled by a single actuating mechanism.

Normally each storage element row 21 would be provided with its own reading and writing units, as shown in FIG. 3. Utilizing this type of arrangement it would be possible to simultaneously read in or write out a number of binary digits constituting a binary number.

Although a rectangular array of data storage elements associated with a number of reading and writing heads would be useful for many applications, in other cases it might be desired to provide only a single reading and writing head associated with a rectangular array of data storage elements. In this event the carriage such as 41*a* could be provided with actuators for movement along two horizontal axes. The carriage 41*a* could therefore be moved to place any one of a large number of data storage elements adjacent a reading or writing station as might be desired.

In some cases it might even be desirable to extend the operation of a device of FIG. 3 to three dimensions by providing a stack of carriage plates 41*a* with means to slide a selected plate from the stack and to place one or more reading or writing units adjacent particular data storage elements in the plate.

In addition to the modification suggested above it should be noted that many of the features of the device of FIG. 1 might be incorporated in the device of FIG. 3 and vice versa. Obviously the device of FIG. 1 could be arranged to have a plurality of data storage elements each with an associated reading-writing unit. Also, although the device of FIG. 1 is shown with only two fluid channels which serve the purpose of writing and reading, the device of FIG. 1 could also be adapted to the three channel separate reading and writing arrangement of FIG. 3. Conversely, the combined reading and writing arrangement of the device of FIG. 1 could be adapted to the device of FIG. 3.

In connection with the device of FIG. 1 it should also be noted that the righthand fluid channel through the plates is provided so that a device producing discrete positive and negative pressure signals may be provided. If it were acceptable to produce signals consisting only of a pressure condition or a no-pressure, plugged condition in the channel 36, then the righthand channels 17 and 37 could be dispensed with and the output at port 18 would consist of either a positive pressure in the event plug 35 were located in pocket 23 or a no-pressure plugged condition when the plug 35 resided in pocket 19.

Although the present invention has been explained with reference to use in connection with a binary system it will be obvious that the invention is not limited to the storage of data in binary notation. For example, the device of FIG. 3 could be modified to contain ten pockets in the carriage plate 41 with only a single plug in one of the ten pockets. In this manner, the present invention could readily be adapted to store decimal data directly.

For the purpose of illustration, the invention has been described as having a carriage adapted for linear movement. It will be obvious however that the data storage elements in the device could be arranged in a circular array and that the movement of the carriage plate might then be circular rather than linear. This arrangement might be advantageous in some cases due to the saving of space normally required to allow for linear displacement of the carriage plate. The members in which the storage elements are placed need not be a flat plate, but could be cylindrical with the storage elements arranged on the cylindrical surface. It will be appreciated from the modifications suggested above that there is no limitation to the manner in which the storage elements are arrayed in the present apparatus.

Although the size of the components of a device according to the present invention is not important from a theoretical point of view, it is of interest from a practical standpoint that a device according to the present invention might be constructed of exceedingly small dimensions. For example, the various plates utilized in the device might be constructed of sheet metal stock of a thickness on the order of hundredths of an inch. Other dimensions of the plugs, channels, etc., could be correspondingly small. Since the present invention is susceptible of being constructed to a very small scale it makes possible the storage of data with an economy of space comparable to or unattainable with many more complex and more expensive devices.

From the foregoing description and explanation it may be seen that the present invention provides a fluid-pressure data storage device which is simple, inexpensive and reliable and which is capable of storing a relatively large amount of data in a small space. Many modifications might be made to the particular embodiments of the invention shown and described herein. Accordingly, the scope of the invention is not to be construed to be limited to those embodiments described, but is to be limited solely by the appended claims.

I claim:

1. Fluid-pressure-operated apparatus for recording data comprising a first plate having an indentation in the under surface thereof and having a fluid channel communicating with said indentation, a second plate subjacent to said first plate and having at least one indentation in the upper surface thereof, said second plate further having a fluid channel communicating with each said indentation, at least one element located in said indentations and adapted to fit interchangeably in any of said indentations, means for moving one of said plates relative to the other of said plates to selectively place the indentation in said first plate adjacent a desired one of said plurality of indentations in said second plate, and means for conveying fluid pressure signals to said fluid channels whereby the position of said element may be controlled in response to fluid signals to store data supplied to said apparatus.

2. A fluid-pressure-operated data-storage device comprising a first member defining a station, a second member defining a plurality of stations, an element adapted to be positioned at any of said stations, means for moving said element from the station of one member to the station of the other member in response to fluid pressures applied to said stations, and means for causing relative movement of one of said first and second members with respect to the other of said first and second members whereby said element may be transferred to desired ones of the stations in said second member in response to fluid pressure signals to record data in said apparatus.

3. Fluid-pressure-operated data-storage apparatus comprising a first plate having an indentation in the under surface thereof and having a fluid channel communicating with said indentation, a second plate subjacent to said first plate and having a plurality of indentations in the upper surface thereof, said second plate further having a fluid channel communicating with each said indentation, at least one element located in said indentations and adapted to fit interchangeably in any of said indentations, means for moving one of said first and second plates relative to the other of said first and second plates to selectively place said indentation in said first plate adjacent a desired one of the indentations in said second plate, and means for conveying fluid pressure signals to said fluid channels whereby information conveyed to said apparatus by means of fluid pressure signals supplied to the apparatus may be stored and retained by relative movement of said plates to transfer said element to a desired one of said indentations in said second plate.

4. A fluid-pressure-operated data-storage device comprising a first member having a station therein and a fluid channel communicating with said station, a second member having a second station therein, an element adapted to be positioned at either of said stations and to substantially close the fluid channel communicating with said first station when the element resides at that station, means for normally retaining said first and second members with their respective stations adjacent so that said element may be moved to one or the other of said stations in response to fluid pressures applied to said stations, and means for moving said members to separate said stations while retaining said element in position at a respective one of said stations.

5. Fluid pressure operated data storage apparatus comprising a first horizontal plate having an indentation in the under surface thereof and having a fluid channel communicating with said indentation, a second horizontal plate subjacent to said first plate and having an indentation in the upper surface thereof, said second plate further having a fluid channel communicating with its said indentation, a plug located in one of said indentations and adapted to fit interchangeably in either of said indentations, and means for moving one of said first and second plates relative to the other of said first and second plates to selectively place said indentations in adjoining positions or in pre-determined spaced positions, whereby information conveyed to said apparatus by means of fluid pressure signals supplied to the apparatus may be stored and retained by operation of the apparatus.

6. Fluid-pressure-operated stored data readout apparatus comprising a first member having a fluid channel therein, a second member having a plurality of stations therein, an element adapted to be positioned at any of said stations, means for applying a fluid pressure to said fluid channel to sense the presence of said element at an adjacent station of said second member, and means for causing relative movement of said members to place said fluid channel adjacent a desired one of said stations.

7. Fluid-pressure-operated stored data readout apparatus comprising a first horizontal plate having at least one fluid channel therethrough, a second horizontal plate subjacent to said first plate and having a plurality of indentations in the upper surface thereof, said second plate further having a fluid channel communicating with each said indentation, at least one element located in said indentations in correpondence with stored data and adapted to fit interchangeably in any of said indentations, means for moving one of said first and second plates relative to the other of said first and second plates to selectively place the fluid channel in said first plate adjacent a desired one of the indentations in said second plate, and means for conveying fluid pressure signals to and from said fluid channels whereby data stored in said apparatus by reason of the location of said element may be derived from said apparatus in the form of fluid pressure signals.

8. Fluid-pressure-operated data-storage and readout apparatus comprising a first member having a pair of spaced fluid channels therein, a second member having a plurality of similarly spaced stations therein, an element adapted to be positioned at any of said stations, means for applying fluid pressure to said fluid channels to sense the location of said element in the adjacent pair of said stations, and means for causing relative movement of one of said first and second members with respect to the other of said first and second members to place said fluid channels adjacent a desired pair of said stations.

9. Fluid pressure operated apparatus for producing a signal corresponding to stored data comprising a first plate having a pair of spaced fluid channels communicating through said plate, a second plate subjacent to said first plate and having a plurality of indentations in the upper surface thereof spaced to correspond with the spacing of the fluid channels in said first plate, said second plate further having a fluid channel communicating with each said indentation, at least one element located in said indentations in correspondence with stored data and adapted to fit interchangeably in any of said indentations, means for moving one of said first and second plates relative to the other of said first and second plates to selectively place the fluid channels in said first plate to communicate with desired ones of said indentations in said second plate, and means for conveying fluid pressure signals to and from said fluid channels, whereby fluid pressure signals may be supplied from said apparatus corresponding to said information stored by said apparatus.

10. Fluid-pressure-operated data-storage apparatus comprising a structure containing at least two stations, a fluid channel at at least on of said stations, an element adapted to be positioned at any of said stations, means for moving said element from one to another of said stations by a fluid pressure-generated force, and means for producing a fluid pressure output signal by the fluid flow restricting presence or fluid flow facilitating absence of said element in said channel.

11. Fluid-pressure-operated data-storage apparatus comprising a first horizontal plate having an indentation in the under surface thereof and having a fluid channel communicating with said indentation and a further fluid channel spaced from said first fluid channel, a second horizontal plate subjacent to said first plate and having a plurality of indentations in the upper surface thereof, said second plate further having a fluid channel communicating with each said indentation from the lower surface of said second plate, at least one plug located in said indentations and adapted to fit interchangeably in any of said indentations, means for moving one of said first and second plates with respect to the other of said first and second plates to selectively place said indentation in said first plate or said further fluid channel in said first plate adjacent a desired one of the indentations in said second plate, a third horizontal plate subjacent said second plate having fluid channels located in positions corresponding to the position of the fluid channels in said first plate, and means for conveying fluid pressure signals to and from said fluid channels whereby information conveyed to said apparatus by means of fluid pressure signals supplied to the apparatus may be stored and retained by relative movement of said plates and at a later time fluid pressure signals may be supplied from said apparatus indicative of the information so stored.

12. Fluid-pressure-operated data-storage apparatus, comprising a first member containing a station, a second member containing at least two stations, an element adapted to be positioned at any of said stations, means for moving said first member relative to said second member, means for moving said element from one to another of said stations in response to fluid pressure signals, and means including a fluid pressure channel communicating with the first said station for sensing the position of said element.

13. Fluid-pressure-operated data-storage apparatus comprising a first horizontal plate having an indentation in the under surface thereof and having a fluid channel communicating with said indentation from the upper surface of said plate, a second horizontal plate subjacent to said first plate and having an indentation in the upper surface thereof, said second plate further having a fluid channel communicating with said latter indentation from the lower surface of said second plate, a plug located in one of said indentations and adapted to fit interchangeably in either of said indentations, means for moving one of said first and second plates relative to the other of said first and second plates to selectively place said indentations in adjoining positions or in predetermined spaced positions, and a fluid channel through each of said plates located to communicate with the indentation in the opposite plate when said indentations are in said spaced position, whereby information conveyed to said apparatus by means of fluid pressure signals supplied to the apparatus may be stored and retained and at a later time fluid pressure signals may be supplied from said apparatus indicative of information so stored.

14. Fluid-pressure-operated data-storage apparatus, comprising a first member containing a station, a second member containing at least two stations, an element adapted to be positioned at any of said stations, means for moving said first member relative to said second member, means for moving said element from one to another of said stations in response to fluid pressure signals, and a member movable with respect to said second member containing at least one fluid pressure channel for sensing the position of said element.

15. Fluid-pressure-operated data-storage apparatus comprising a first plate having an indentation in the under surface thereof and having a fluid channel communicating with said indentation and at least one further fluid channel spaced from said first fluid channel, a second plate subjacent to said first plate and having a plurality of indentations in the upper surface thereof, said second plate further having a fluid channel communicating with each said indentation, at least one element located in said indentations and adapted to fit interchangeably in any of said indentations, means for moving one of said plates to selectively place said indentation or said further fluid channel in said first plate adjacent a desired one of the indentations in said second plate, a third plate subjacent said second plate having fluid channels located in positions corresponding to the position of the fluid channels in said first plate, and means for conveying fluid pressure signals to and from said fluid channels, whereby information conveyed to said apparatus by means of fluid pressure signals supplied to the apparatus may be stored and retained and at a later time fluid pressure signals may be supplied from said apparatus indicative of the information so stored.

16. A record for the storage of data, comprising a member having a plurality of stations, at least one element adapted to be positioned at any of said stations, and a fluid pressure channel communicating with each of said stations to allow the presence or absence of an element at each of said stations to be sensed by the application of a fluid pressure thereto.

17. A record for the storage of data, comprising a member having a plurality of indentations, a fluid pressure channel communicating with each of said indentations, and at least one element adapted to be positioned in any of said indentations and adapted to close the fluid channel of the indentations in which its is positioned, whereby the presence or absence of an element at each said indentation may be sensed by the application of a fluid pressure to the associated fluid pressure channel.

18. Apparatus for the storage of data comprising a record including a member having a plurality of stations, at least one element adapted to be positioned at any of said stations, and a fluid pressure channel communicating with each of said stations; and means for moving said element from one station to another to record data in said record.

19. Fluid pressure operated apparatus for reading data stored in a record, said apparatus comprising a record including a member having a plurality of stations, at least one element adapted to be positioned at any of said stations and a fluid pressure channel communicating with each of said stations; means for applying fluid pressures to said fluid pressure channels, and means for sensing the fluid pressure change due to the presence of said element at a particular one of said stations.

References Cited in the file of this patent

UNITED STATES PATENTS

| | | |
|---|---|---|
| 2,131,503 | Elliott | Sept. 27, 1938 |
| 2,369,430 | Brand et al. | Feb. 13, 1945 |
| 2,510,552 | Carroll et al. | June 6, 1950 |
| 2,661,154 | Carlson | Dec. 1, 1953 |
| 2,904,070 | Lynott | Sept. 15, 1959 |